Patented Nov. 2, 1948

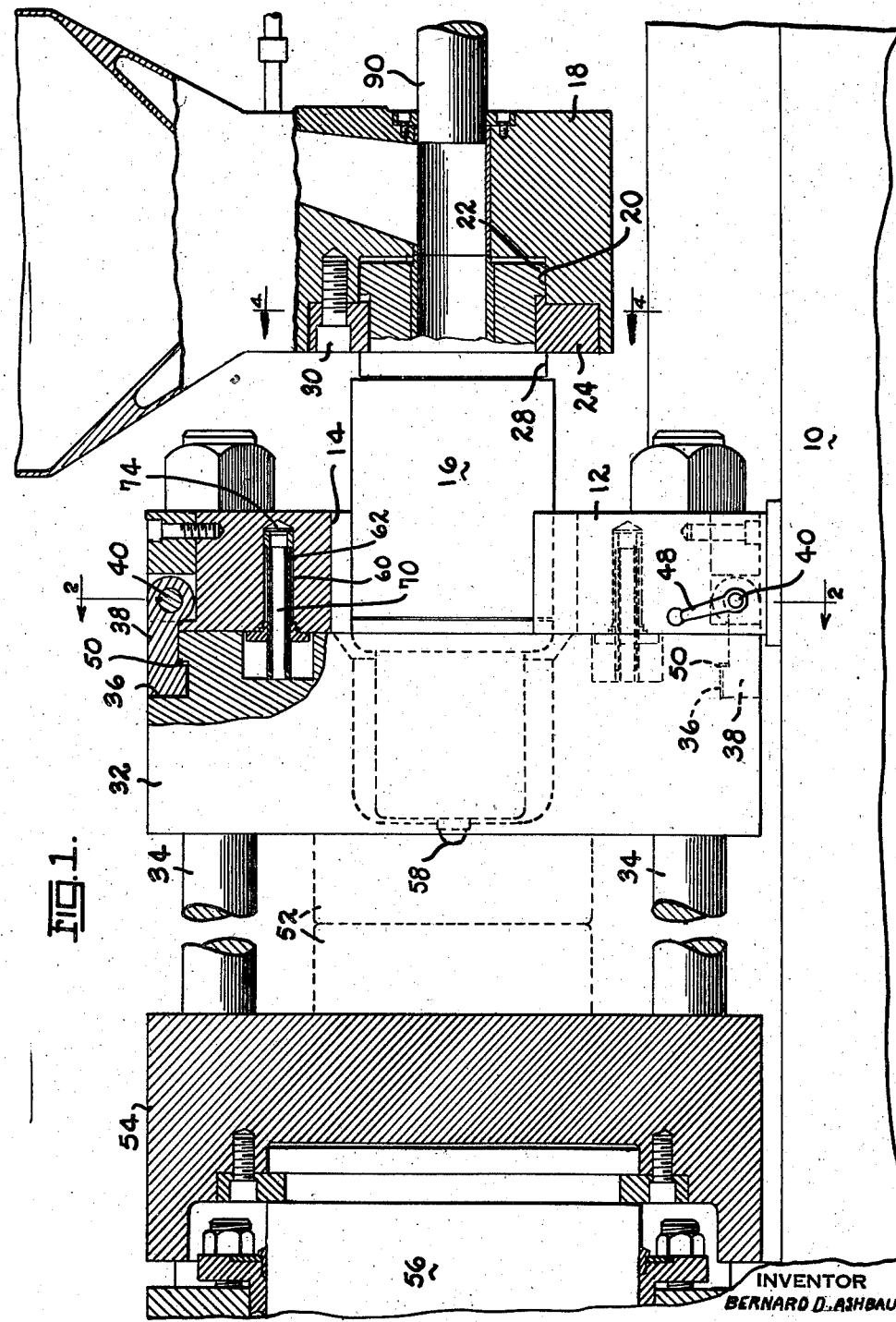

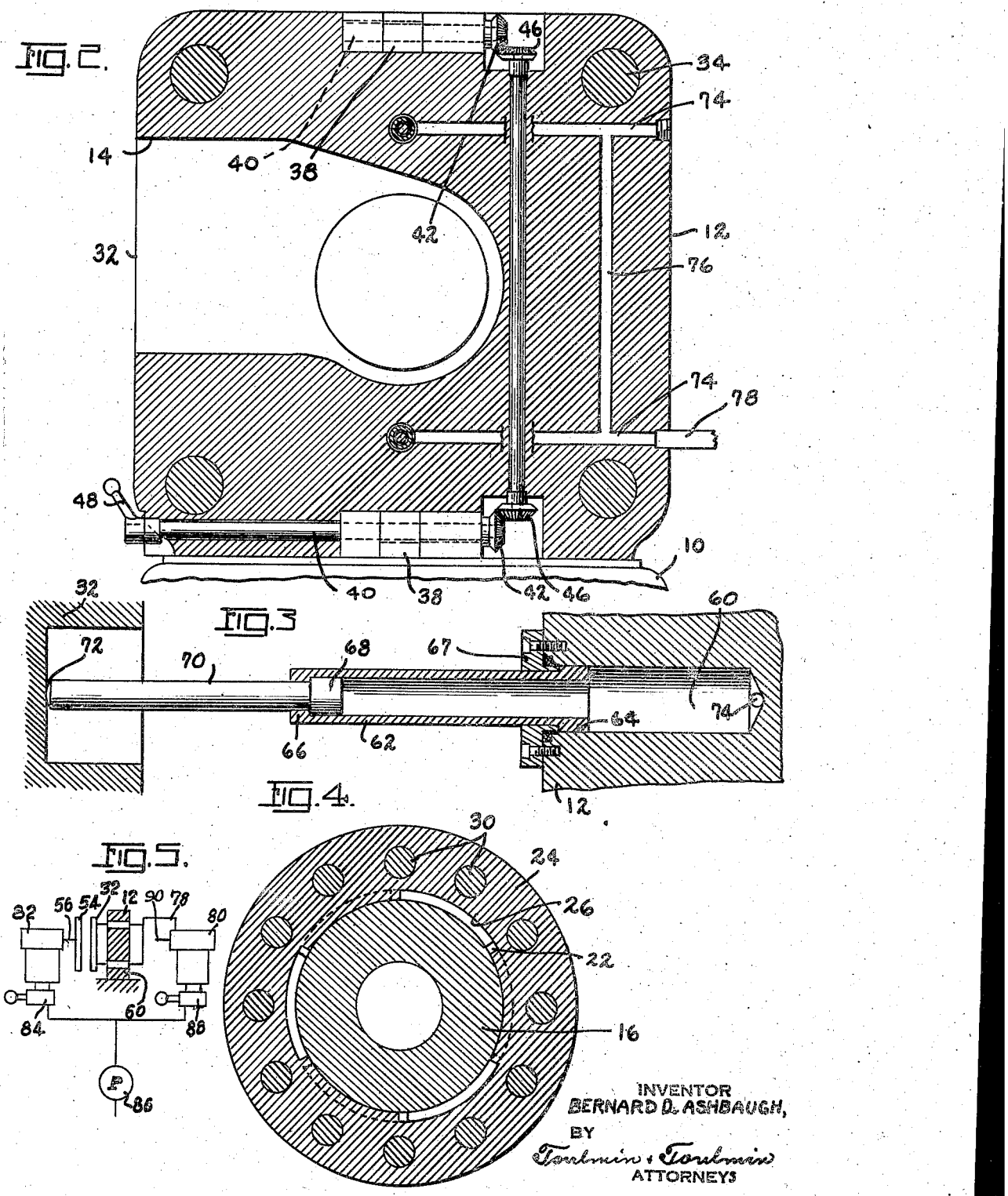

2,453,058

UNITED STATES PATENT OFFICE 2,453,058

INJECTION MACHINE

Bernard D. Ashbaugh, Mount Gilead, Ohio, assignor to H-P-M Development Corporation, Wilmington, Del., a corporation of Delaware Application April 13, 1945, Serial No. 588,128

6 Claims. (Cl. 18—30)

This invention relates to improvements in molding presses. More particularly, this invention relates to improvements in the method of mounting the heating chamber in injection presses and to an improved bolster arrangement for supporting the stationary portion of a mold.

In injection molding presses it is sometimes necessary to change the type or color of plastic material being molded. This is usually accomplished by ejecting the plastic in the heating chamber into the atmosphere. This is sometimes expensive because the plastics cannot always be reworked. Also, the heating chamber is not completely cleaned and discoloration and contamination of the molding material used subsequently sometimes results.

Accordingly, it is an object of this invention to provide a means of mounting a heating chamber in an injection machine such that the heating chamber may easily be removed for replacement by another when it is desired to change molding material.

It is another object to provide a stationary bolster arrangement in connection with the aforementioned heating chamber support which facilitates the replacement of the heating chamber.

It is still another object to provide an improved support for the stationary half of a mold pair which permits easy access to the nozzle of the heating chamber.

These and other objects and advantages will become more apparent upon reference to the accompanying drawings, in which:

Figure 1 is a vertical section through a part of an injection molding machine having a bolster arrangement and heating chamber support according to this invention;

Figure 2 is a transverse section taken on the line 2—2 of Figure 1 and illustrates more in detail the construction of the stationary bolster;

Figure 3 is an enlarged view of the cushioning cylinders mounted in the stationary bolster;

Figure 4 is a section taken on the line 4—4 of Figure 1 illustrating the heating chamber support; and Figure 5 is a diagrammatic view of an operating circuit for a press having this invention.

Referring to the drawings, the molding press shown therein comprises a bed 10 which has stationarily mounted thereon a fixed bolster 12. The bolster plate 12 has a laterally extending slot 14 therein, more particularly shown in Figure 2, for receiving the heating chamber 16. The heating chamber 16 extends rightwardly to be carried by a frame 18 which is adjustably mounted on the bed 10 by means not shown.

The mounting means for the heating chamber 16 comprise a recess 20 in the frame 18 adapted for receiving the end of the heating chamber which, itself, comprises a plurality of spaced lugs 22. The recess 20 is closed by a ring 24 which comprises notches 26 through which the lugs 22 are adapted to pass. The rear surface of the ring 24 and the mating surfaces of the lugs 22 are formed to cooperating inclined plates so that a rotation of the heating chamber is effective securely to lock it to the ring 24. The locking is accomplished by the flange 28 on the heating chamber which engages the adjacent surface of the ring 24. The ring 24 is rigidly secured to the frame 18 by the bolts 30.

The heating chamber 16 extends leftwardly through the bolster plate 12 and extends into a mold supporting plate 32 which is slidably carried on the strain rods 34, the latter being connected at one end to the bolster plate 12 and, at the other end, to the mold clamping motor, not shown.

The plate 32 comprises the notches 36 in either side thereof adapted for receiving the hooks 38. Each of the hooks 38 is keyed to a transverse shaft 40 each of which in turn carries a bevel gear 42. A vertical shaft 44 having the bevel gears 46 on either end thereof drivingly connect the shafts 40. The lower shaft 40 extends outwardly through the bolster plate 12 and terminates in the lever 48. Rotation of the lever 48 is thus effective to rotate the hooks 38 to disengage them from the notches 36.

A clearance 50 is provided in the notches 36 which permit a predetermined limited movement of the plate 32 relative to the plate 12.

The plate 32 is normally urged leftwardly away from the plate 12 and, when the mold halves 52 are clamped together by the actuation of the platen 54 by the clamping motor ram 56, is adapted to move rightwardly to its Figure 1 position thereby bringing the nozzle 58 of the heating chamber 16 into operative engagement with the right mold half 52.

The means for yieldably urging the plate 32 away from the plate 12 is more particularly shown in Figure 3, wherein it will be seen that the plate 32 comprises a bore 60 within which is reciprocable the hollow plunger 62. A head on the right end of the plunger 62 at 64 is adapted for engagement with the gland 66 secured at the opening of the bore 60. The left end of the plunger 62 has an internal flange 66 thereon for abutting the piston 68 of a plunger 70 which is reciprocable within the hollow plunger 62. The plunger 70 abuts the mold supporting plate 32 as at 72 for urging the said plate leftwardly.

A pair of transverse bores 74 communicate, respectively with the upper and lower bores 60 in the booster plate 12. The bores 74 are interconnected by a vertical passage 76 in the plate 12 and the lower bore 74 is connected by a conduit 78 with the retraction side of the injection plunger motor indicated at 80 in Figure 5.

Referring to Figure 5, this view illustrates a typical operating circuit for a hydraulic injection molding press constructed according to my invention. The motor for operating the clamping plunger 56 is indicated at 82 and has the two ends thereof connected with a distributing valve 84 which receives pressure fluid from a fluid source 86. The injection plunger operating motor 80 is connected with a distributing valve 88 which also receives pressure fluid from the source 86.

In operation, with the press in idling position pressure fluid is being directed to the left end of the motor 80 and, therefore, through the conduit 78 to the bores 60 in the plate 12. The plungers 62 and 70 are thus urged leftwardly to move the mold supporting plate 32 leftwardly until it is engaged by the hooks 38. Then, in order to clamp the mold halves together, the valve 84 is shifted to direct pressure fluid to the left end of the motor 82. The movable mold supporting plate 54 advances rightwardly until the molds clamp and thereafter the mold supporting plate 32 also moves rightwardly until it seats against the face of the plate 12.

An injection stroke of the injection plunger 90 is accomplished by shifting the valve 88 to direct pressure fluid to the right end of the motor 80. At this time, the bores 60 are exhausted but this has no effect since the plates 32 and 12 are clamped together. After the injection plunger 90 has completed its stroke, it is retracted by shifting the valve 88 to direct pressure fluid to the left end of the motor 80. After a predetermined dwell period during which the material in the mold 52 solidifies, the valve 84 is shifted to retracting the clamping ram 56 to operate the mold halves. As the clamping ram 56 retracts, the pressure in the bores 60 again urges the plunger 62 and 70 together with the plate 32 leftwardly and separates the right mold half from the nozzle 58. A new cycle of operations may now be commenced.

If it is desired to remove the heating chamber or the nozzle thereof or to have access to the heating chamber for any other reason, the lever 48 may be moved to disengage the hooks 38 from the notches 36. The pressure in the bores 60 is then effective to move the plate 32 leftwardly as indicated in Figure 2 a distance sufficient to permit all parts of the heating chamber to be worked on.

It will be understood that I desire to comprehend within my invention such modifications as may be considered to come within the scope of the claims.

I claim:

1. The combination in a molding machine of a stationary bolster plate, a mold supporting plate adjacent thereto, a plurality of telescoping plungers carried by said bolster plate and abutting said mold supporting plate for urging said plates apart, and means carried by one of said plates and selectively engageable with the other of said plates for limiting the distance which they may be spaced.

2. The combination in an injection molding machine of a bed, a stationary bolster plate mounted on said bed, a transverse notch in said bolster plate, a mold carrying plate adjacent said bolster plate having a recess therein; a heating chamber detachably carried by said injection machine and extending into said notch and recess; telescoping plunger means carried by said bolster plate and abutting said mold carrying plate and operable by pressure fluid for urging said plates apart; means carried by said bolster plate and in engagement with said mold carrying plate for limiting the spacing movement of said plates; and means for disengaging said last mentioned means whereby said mold carrying plate may be spaced away from said bolster plate and beyond the end of said heating chamber.

3. The combination in an injection molding machine; of a heating chamber; a stationary bolster plate, a transverse notch in said bolster plate loosely receiving said heating chamber, a mold carrying plate reciprocably mounted adjacent said bolster plate, a recess in said mold carrying plate into which extends the nozzle end of said heating chamber, telescoping plunger means carried by one of said plates for urging said plates apart, stop means carried by one of said plates for limiting the spacing movement thereof to that necessary to separate the nozzle of said chamber from the mold on said mold carrying plate, manual means for disengaging said stop means for permitting a further spacing movement of said plates, and abutting means on said telescoping plungers for limiting said further spacing movement to limit the said further spacing movement of said plates to that required to position said mold carrying plate beyond the end of said chamber.

4. The combination in an injection molding machine, of a heating chamber, an injection plunger, a fluid motor for reciprocating said injection plunger, a stationary bolster plate, a mold carrying plate reciprocably mounted adjacent said bolster plate, hooks carried by one of said plates for engaging the other thereof for permitting limited relative movement therebetween to separate the nozzle end of said chamber from the mold on said mold carrying plate after an injection cycle, telescoping plungers carried by one of said plates for abutting the other of said plates for urging the same apart to position said mold carrying plate beyond the nozzle end of said chamber when said hooks are disengaged, conduit means connecting said plunger means with said fluid motor for receiving pressure fluid therefrom when said injection plunger is retracted, manual means for disengaging said hooks to permit further spacing movement of said plates, and abutting means on said plungers for limiting said further spacing movement by said plungers.

5. In an injection molding machine, an injection plunger, a fluid motor with advancing and retracting areas for advancing and retracting said plunger, a heating chamber within which said plunger reciprocates, means detachably mounting said heating chamber on said machine comprising a bayonet lock, a stationary bolster plate having a transverse slot therein through which said heating chamber extends, a mold carrying plate reciprocably mounted adjacent said bolster plate having a recess therein into which the nozzle end of said heating chamber extends, telescoping plunger means carried by said bolster plate operable to urge said plates apart a distance sufficient to place said mold carrying plate beyond the nozzle end of said chamber, a pair of hooks pivotally carried by said bolster plate adapted for engaging correspondingly shaped recesses in said mold carrying plate for limiting the spacing movement of said plates for separating the nozzle of said chamber from the mold after an injection cycle, manual means for simultaneously rotating said hooks out of engagement with said mold carrying plate to permit a further spacing movement of said plates, abutment means on said telescoping plungers for limiting the further spacing movement of said plates thereby, and channel means interconnecting said plungers with the retracting area of said fluid motor.

6. The combination in a molding machine of a stationary bolster plate, a mold supporting plate movably mounted adjacent said bolster plate; a plurality of telescoping plungers carried by one of said plates and abutting the other thereof and operable by fluid pressure for urging said plates apart, latch means carried by one of said plates and selectively engageable with the other thereof for limiting the distance they may be spaced apart by said plungers, and cooperating stop means on said plungers for limiting their relative movement when said latch means are disengaged thereby also to limit the movement of said plates apart.

BERNARD D. ASHBAUGH.

REFERENCES CITED

The following references are of record in the file of this patent:

UNITED STATES PATENTS

| Number | Name | Date |
|---|---|---|
| 178,562 | Renwick | June 13, 1876 |
| 501,426 | Kampf | July 11, 1893 |
| 878,298 | Lichtig | Feb. 4, 1908 |
| 1,095,926 | Powell | May 5, 1914 |
| 1,723,131 | Burkholder | Aug. 6, 1929 |
| 1,819,168 | Heil | Aug. 18, 1931 |
| 2,107,190 | Shaw | Feb. 1, 1938 |
| 2,191,882 | Ernest et al. | Feb. 27, 1940 |
| 2,244,842 | Knowles | June 10, 1941 |
| 2,246,414 | McIntyre | June 17, 1941 |
| 2,253,460 | Hempel | Aug. 19, 1941 |
| 2,360,000 | Lawyer | Oct. 10, 1944 |